C. C. Parsons.
Purifying Acetic Acid.
Nº 87,193.  Patented Feb. 12, 1869.

Witnesses:
Alex H Roberts
J. M. Congdon

Inventor:
C. C. Parsons
per Munn &
Attorneys

UNITED STATES PATENT OFFICE.

C. C. PARSONS, OF NEW YORK, N. Y.

IMPROVEMENT IN PURIFYING PYROLIGNEOUS OR ACETIC ACID.

Specification forming part of Letters Patent No. 87,193, dated February 23, 1869; antedated February 12, 1869.

*To all whom it may concern:*

Be it known that I, C. C. PARSONS, of the city, county, and State of New York, have invented a new and Improved Process of Manufacturing Pyroligneous or Acetic Acid; and I do hereby declare that the following is a full, clear, and exact description thereof, which will enable others skilled in the art to understand the same, reference being had to the accompanying drawings, forming a part of this specification.

Figure 1:
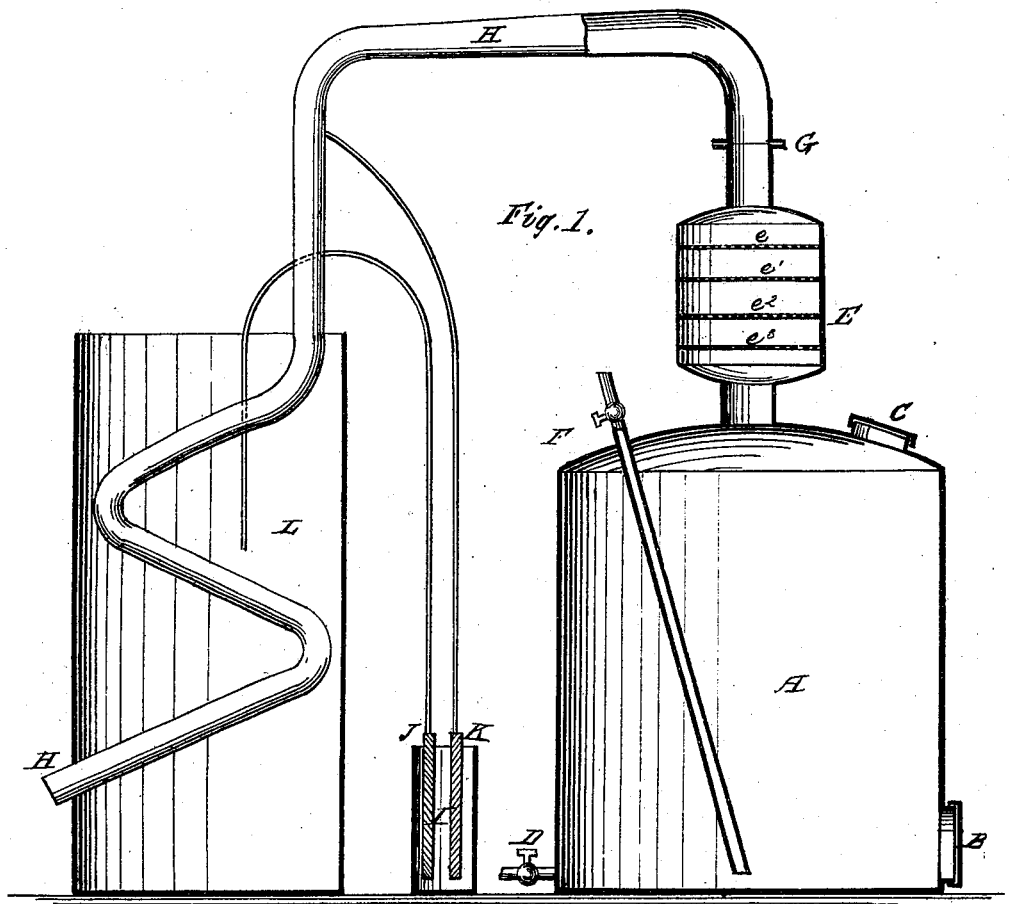
Figure 2:
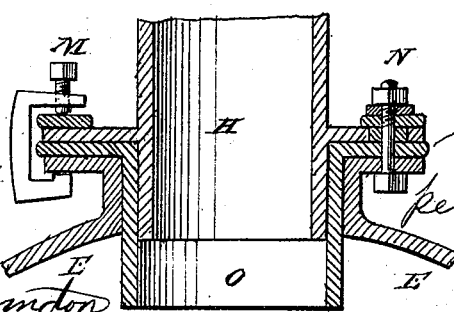

Figure 1 represents a sectional elevation of an apparatus convenient for carrying out my improved process. Fig. 2 is a detail vertical section of a portion of the same.

Similar letters of reference indicate corresponding parts.

This invention relates to a new process of making acetic acid, and more particularly to a new manner of agitating and purifying the same; also, to the application of electricity to the process.

The invention consists, first, in agitating, and thereby thoroughly mixing and exposing to chemical action, the substance to be distilled, by forcing either steam or hot or cold air, together or separately, in at the bottom of the vessel in which the said substance is contained, whether that vessel be the still or another receptacle; second, in passing the pyroligneous or acetic acid, while in a state of vapor, through some carboniferous or purifying substance; third, in insulating and protecting from chemical action, by galvanism or similar means, the condensing-worm or the cooling apparatus, in which the vapors escaping from the still are condensed.

A is the still; B, a man-hole and plate near the bottom of the still; C, a similar man-hole and plate in the top of the still; D, a pipe, reaching nearly to the bottom of the still; E, a box, containing purifying material on perforated shelves $e'$ $e''$ $e'''$ $e''''$, to keep the purifying material from settling together, for which purifying material I prefer charcoal. F is a goose-neck pipe and condensing-worm; G, a joint, by which the worm and pipe F are insulated from the box E. H is the worm-tub; I, a draw-off cock for emptying the still A. J is the cell of a galvanic battery; K, a copper plate of the battery. L is the zinc plate. O is a ring, of india-rubber or any other suitable material, for insulating the pipe F from the box E. N represents one method of tightening the joint G, and M another method for accomplishing the same thing.

Having described one form of apparatus, I will now describe how I carry my process into effect.

If I am using acetate of lime or soda or other acetate I introduce into the still the acetate and sulphuric or muriatic acid, as may be desired, in the ordinary proportions. I put with them a little less water than is ordinarily used. I then force either steam or hot or cold air into the bottom of the still, thereby dissolving and thoroughly mixing the acetate with the acid used and with water. When these are sufficiently mixed, which must be learned by experience, as the time will depend on the relative amounts of materials used and of air forced in, I start the fires under the still. The box E must have been previously filled with some carboniferous material. I prefer freshly-burned wood-charcoal, in pieces about the size of the end of the finger. The charcoal should not be more than a foot in depth on each of the perforated shelves, as its weight would otherwise make it too compact and cause it to impede the passage of the vapor. Any number of layers of purifying substance may be used. If I wish to redistill more or less impure pyroligneous or acetic acid, I simply put it into the still and start the fire. Having started the fire, I force in either air or steam at intervals during the distillation, keeping the supply of such air or steam steady toward the close of the process, to distill all the acid. This last acid, if too weak for direct use, may be returned to the still in the next charge, instead of water. When the acid has all passed over I shut off the steam, draw the fire, and draw off the contents of the still through the cock. I then open the man-hole plates, and a current of cold air at once rushes through the still, cooling it rapidly.

Any sort of an insulating-joint may be used at G, provided the metal of the condensing-worm and the box E are kept from contact with each other by any material which is a non-conductor of electricity and is not acted on by the acid vapors.

The battery should be one which will give a steady constant current. The zinc element may be connected with the condensing-worm, and the copper element may connect with a rod dipping into the water of the condensing-tub, or it may, if properly insulated, be passed into the condensing-worm and exposed to the vapor there. A zinc plate may also be used and connected directly with the worm, which will form the other element itself. The worm may be insulated from the tub, or the tub itself may be insulated.

I have described all my improvements together as pertaining to one process; still it is evident that any one or more of them may be used, jointly or separately, and that they may be applied to existing forms of apparatus without difficulty.

For a condensing-worm I prefer either silver, copper, or tin-lined lead pipe.

Having thus described my invention, what I claim as new, and desire to secure by Letters Patent, is—

1. Passing the vapors arising from the still through carboniferous or purifying material, in the manner and for the purpose substantially as described.

2. The process herein described of making pyroligneous or acetic acid by the separate or combined application of hot or cold air or steam, of purifying material, and of the galvanic battery, as set forth.

C. C. PARSONS.

Witnesses:
 FRANK BLOCKLEY,
 J. M. COVINGTON.